May 7, 1963        G. ALFIERI        3,088,780
FAILURE PROTECTION PLURAL BRAKE VALVE SYSTEM
Filed Nov. 5, 1958
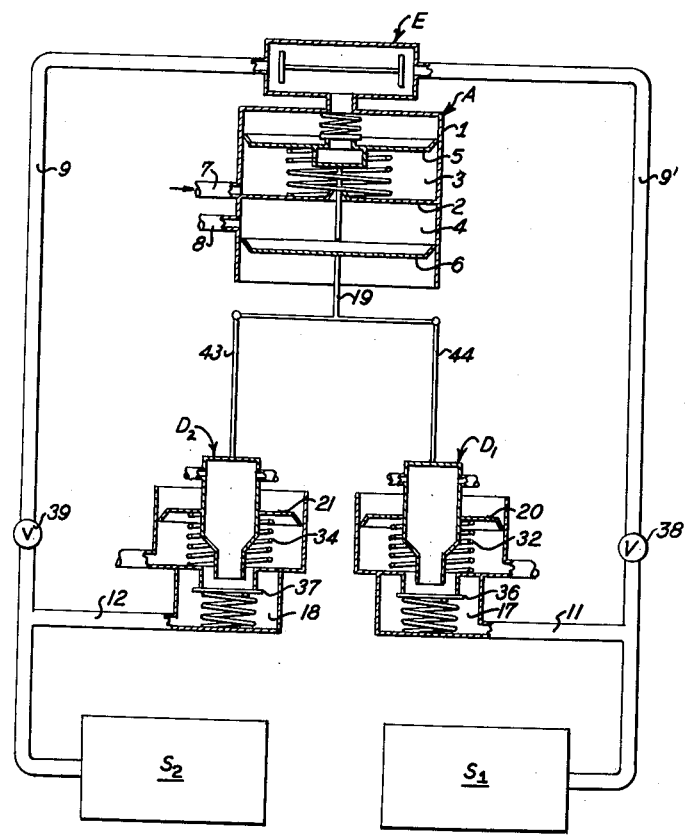
INVENTOR
GIUSEPPE ALFIERI

United States Patent Office 3,088,780
Patented May 7, 1963

3,088,780
FAILURE PROTECTION PLURAL BRAKE VALVE SYSTEM
Giuseppe Alfieri, Milan, Italy, assignor to Fabbrica Italiana Magneti Marelli S.p.A., Milan, Italy, a company of Italy
Filed Nov. 5, 1958, Ser. No. 772,020
Claims priority, application Italy Nov. 5, 1957
1 Claim. (Cl. 303—29)

This invention relates to pneumatic braking equipment.

It is an object of the present invention to provide improvements in pneumatic braking equipment with two or more sections in order to permit, in case of damage or failure of one of the sections, the other to remain effective.

The improvements of the invention enable the positive isolating of the damaged section.

Said improvements are characterized in that the feeding of the two sections takes place through a balanced double check valve that is displaced to block feed conduits in response to a pressure imbalance that may occur in case of damage or rupture to one of said conduits or said sections.

The control of the distributors associated with the different sections may be obtained, for example, by means of a pneumatic servocontrol or by means of a brake pedal.

The improvements of the invention are illustrated by way of example in the accompanying drawings wherein the sole figure represents the diagram of a braking device according to the invention, with two sections with two tanks.

The equipment illustrated in the drawing comprises essentially an automatic relay valve or operator A of conventional kind, two brake distributor valves or distributors $D_1$ and $D_2$ for actuating the operating members of the respective braking sections, a double check valve or control E including valve means V and compressed air tanks $S_1$ and $S_2$.

The member A comprises a cylinder 1 subdivided by a separating wall 2 into two chambers 3 and 4, wherein there slide respectively piston 5 and piston 6, the chamber 3 being connected through the conduit 7 with an emergency conduit by which it is permanently fed with air under pressure, while the chamber 4 is connected, through the conduit 8, with a controllable device (not shown) whence the compressed air flows thereinto braking and flows out thereof as soon as the braking action ceases.

The chamber 3 fed continuously with air under pressure is connected by the double check valve E and the conduits 9 and 9' to the tanks $S_1$ and $S_2$ which are connected by the two conduits 11 and 12 to the pre-chambers 17 and 18 of the respective distributors $D_1$ and $D_2$.

The piston 6 with its stem 19 controls mechanically the pistons 20 and 21 of the distributors $D_1$ and $D_2$ by means of the rigid fork including legs 43 and 44. The force for the displacement of the control piston 6 and therefore of the fork 43—44 in the direction of the arrow F, is opposed by the reactions of the two springs 32 and 34 of the distributors, which force and reactions are determined in such a manner that with the normal stroke thereof the pistons 20 and 21 open the respective inlet valves 36 and 37, which are subjected substantially to the same pressure of the compressed air as in the double check valve E and in the two feed conduits 11 and 12.

If in case of damage such as, for instance, air leakage from one of the two sections, there is a reduced pressure in the damaged section which results in an increased volocity of flow of the compressed air to the damaged section which causes an imbalance between the pressures of the air in the conduits 11 and 12 and the double check valve E is pushed to the side of the damaged section until the inlet port of the respective conduit 9 or 9' is closed while leaving the other section fully effective, whereby the compressed air tank $S_1$ is operatively connected to only one section through the corresponding distributor.

The cut-off cocks 38 and 39 have only the purpose of avoiding waste of compressed air by isolating the supply feed from the damaged section until repair has been effected.

What is claimed is:

A brake relay means including a plurality of brake distributing valves and an operator for said distributing valves, a main pressure supply connected to said operator, a fluid connection means between said operator and said distributing valves, said distributing valves supplying pressure from said operator to said braking sections upon actuation of said distributing valves, said connection means including a control, and valve means in said control being maintained in a first position under the action of equal velocities of pressure medium to said distributing valves, whereby said operator is in fluid communication with said distributing valves, said valve means being displaced from said first position in response to unequal velocity flow of fluid to said distributing valves to block the flow of fluid to that distributing valve having the greater velocity flow thereto.

References Cited in the file of this patent
UNITED STATES PATENTS

| | | |
|---|---|---|
| 2,195,214 | Jacob | Mar. 26, 1940 |
| 2,322,658 | Overbeke | June 22, 1943 |
| 2,526,570 | Majneri | Oct. 17, 1950 |
| 2,669,843 | Broadway | Feb. 23, 1954 |
| 2,680,654 | Edge et al. | June 8, 1954 |
| 2,824,627 | Winter | Feb. 25, 1958 |
| 2,854,016 | Margida | Sept. 30, 1958 |
| 2,921,440 | Feibush | Jan. 19, 1960 |